(No Model.)  6 Sheets—Sheet 1.

H. G. PERRY.
TYPE WRITING MACHINE.

No. 552,774.  Patented Jan. 7, 1896.

Fig. 1.

WITNESSES:
Paul Johot
H. P. Hutchinson

INVENTOR
H. G. Perry
BY Munn & Co.
ATTORNEYS.

(No Model.) 6 Sheets—Sheet 2.

H. G. PERRY.
TYPE WRITING MACHINE.

No. 552,774. Patented Jan. 7, 1896.

Fig. 2.

WITNESSES:
Paul Jahot
W. P. Hutchinson

INVENTOR
H. G. Perry
BY
Munn & Co.
ATTORNEYS.

(No Model.)  6 Sheets—Sheet 3.

H. G. PERRY.
TYPE WRITING MACHINE.

No. 552,774.  Patented Jan. 7, 1896.

WITNESSES:
Paul Johst
W. B. Hutchinson

INVENTOR
H. G. Perry
BY
Munn & Co
ATTORNEYS.

(No Model.) 6 Sheets—Sheet 6.
H. G. PERRY.
TYPE WRITING MACHINE.

No. 552,774. Patented Jan. 7, 1896.

WITNESSES:
Paul Johst
W. P. Hutchinson

INVENTOR
H. G. Perry
Munn & Co
ATTORNEYS.

UNITED STATES PATENT OFFICE.

HORACE G. PERRY, OF SUISUN CITY, CALIFORNIA.

TYPE-WRITING MACHINE.

SPECIFICATION forming part of Letters Patent No. 552,774, dated January 7, 1896.

Application filed November 17, 1894. Serial No. 529,131. (No model.)

*To all whom it may concern:*

Be it known that I, HORACE G. PERRY, of Suisun City, in the county of Solano and State of California, have invented a new and Improved Type-Writing Machine, of which the following is a full, clear, and exact description.

This invention relates to certain improvements in type-writing machines, and has for its object to provide a machine of this character of a simple and inexpensive nature which shall be compact and durable in construction and which shall be adapted to be operated with rapidity and nicety.

The invention consists principally in a type-writing machine having different sets of type-bars, the type-bars of one set being provided with single characters and the type-bars of the other set being provided with duplex or multiple characters printing-points, as "an," "as," "is," &c., adapted to print short words or syllables, and an escapement device so constructed as to feed the carriage different distances corresponding to the space occupied by the character or characters on the type-bar which is operated.

The invention also contemplates certain novel features of the construction, combination and arrangement of the various parts of the improved type-writing machine, whereby certain important advantages are attained and the device is made simpler, cheaper, more compact and otherwise better adapted and more convenient for use, all as will be hereinafter fully set forth.

The novel features of the invention will be carefully defined in the claims.

Reference is to be had to the accompanying drawings, forming a part of this specification, in which similar figures of reference indicate corresponding parts in all the views.

Figure 1:
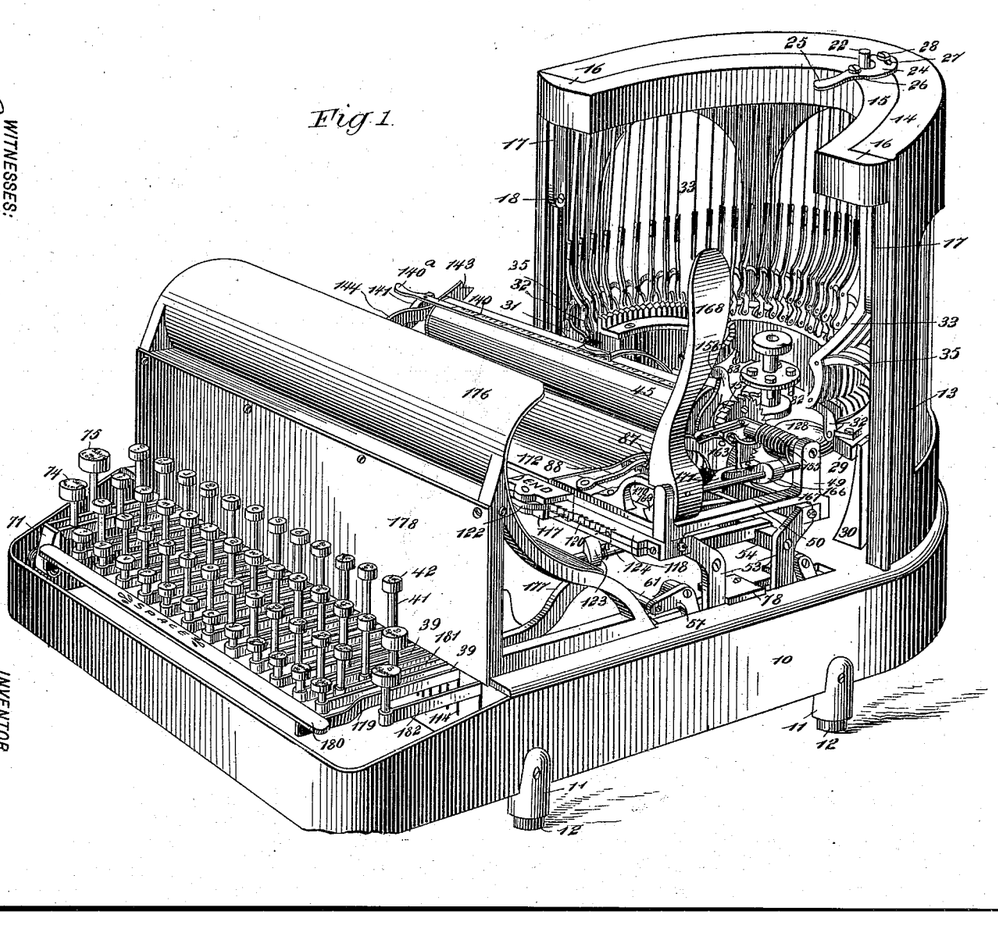
Figure 1 is a broken perspective view of the type-writing machine embodying my invention.
Figure 2:
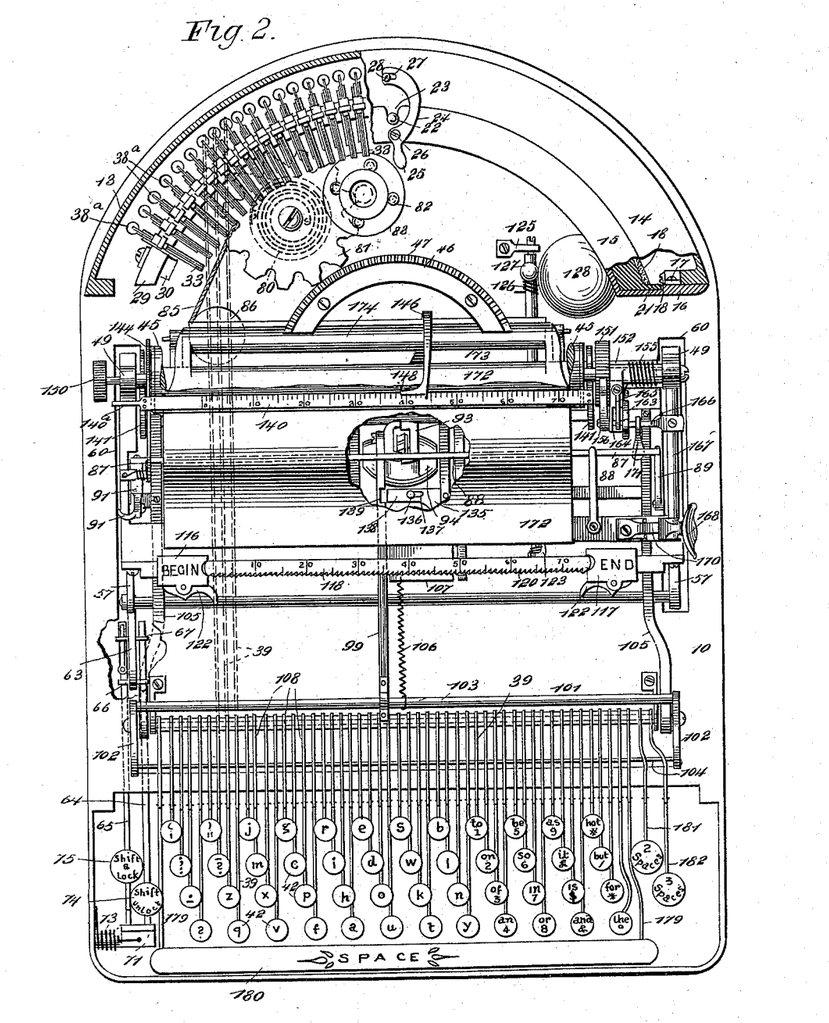
Fig. 2 is a broken plan view, partly in section, of the type-writing machine.

The machine is provided with a suitable base 10, which may be of any approved shape, and this has detachable legs 11, which, by preference, have rubber feet 12. On the back end of the base 10 is an upright frame 13, which has openings in the back to render it light and more ornamental, and at the top it has an inwardly-projecting semicircular flange 14, against which swings the ink-pad frame 15, which is also nearly semicircular in shape and has outturned end flanges 16 overlapping the ends of the flange 14, as shown in Figs. 1 and 2.

Figures 4, 5:
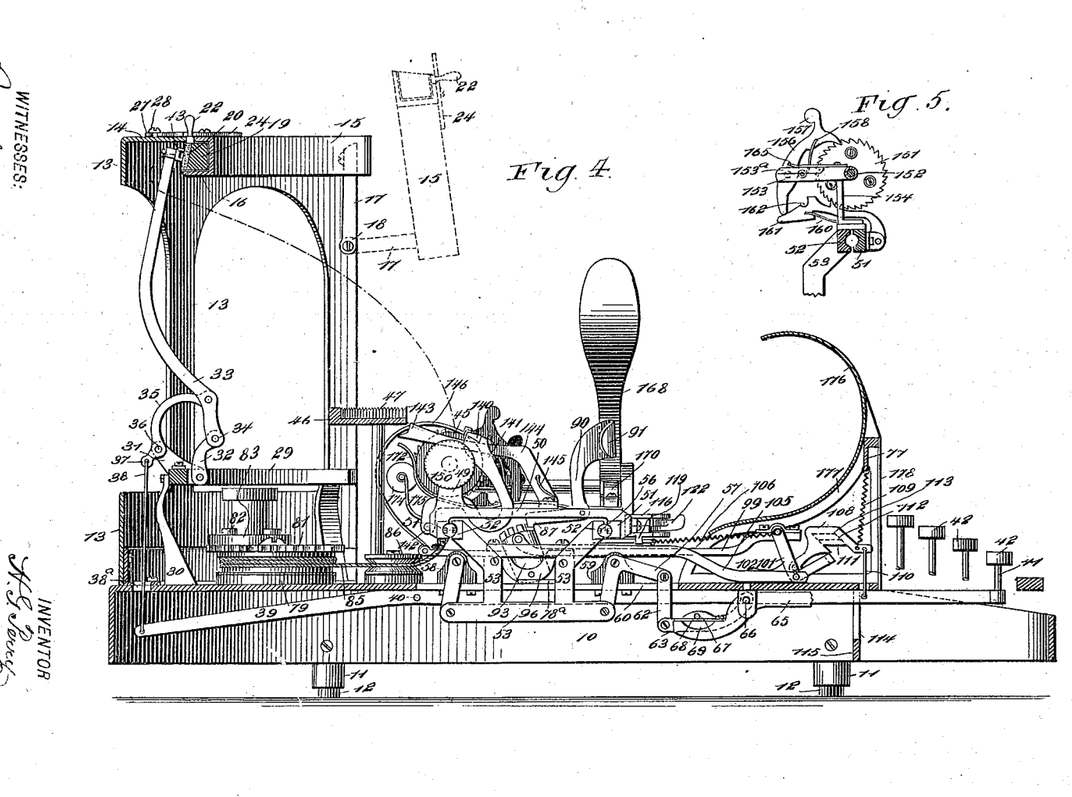
Fig. 4 is a sectional elevation of the machine, showing more clearly the operating parts thereof, the type-bar being shown with its type against the inking-pad.
Fig. 5 is a detail sectional elevation of the ratchet mechanism for turning the platen.
Figures 6, 7, 8:
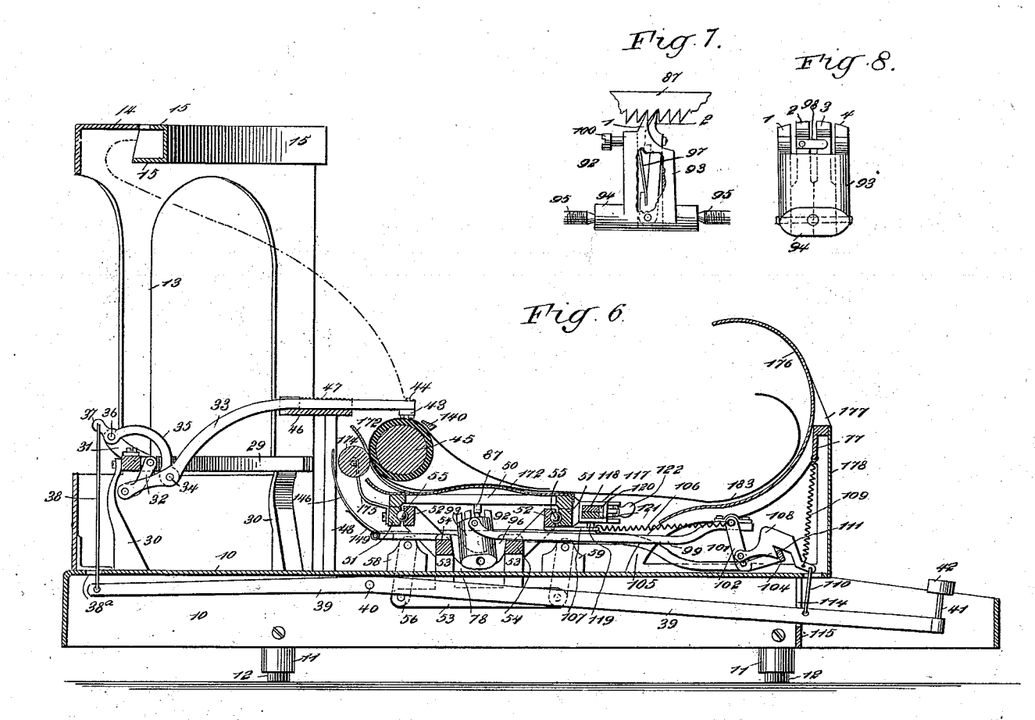
Fig. 6 is a view similar to Fig. 4, but with the inking-pad removed and with the type-bar in printing position.
Fig. 7 is a side elevation of the peculiar escapement which permits the longitudinal movement of the carriage to produce the varying letter-spaces.
Fig. 8 is a detail front elevation of said escapement.

The ink-pad frame is in shape like a trough, rectangular in cross-section, the open side of which is toward the back of the machine, as shown clearly in Fig. 6, and the frame is supported at its ends on arms, 17 which are pivoted to the back 13, as shown best in Fig. 4, so that when desired the frame may be swung outward, as shown by dotted lines in the same figure.

The ink-pad frame contains the ink-pad, which has a comparatively rigid backing 19 resting in the frame 15 and a surface pad 20, which may be of any suitable material and projects rearward from the frame 15, as shown clearly in Figs. 2 and 4, the pad corresponding to the curvature of the frame 15, so that being convex it is well adapted to receive the type on the type-bars, as hereinafter described. The pad has at its ends flanges 21, (see Fig. 2,) which are engaged by projections on the under side of the flange 14, so as to hold the-ink pad in place, and the pad has a vertical handle 22 by which it may be easily removed from the pad-frame 15 when it is to be inked or when a new pad is to be substituted. The top of the frame 15 is notched, as shown at 23, to receive the handle 22 of the pad, and on the top of the frame 15 is a latch 24, which has a forwardly-projecting handle 25 and is pivoted, as shown at 26, the latch having its rear end slotted, as shown at 27, so as to engage a screw or stud 28 on the flange 14, and thus by simply moving the handle 25 the pad-frame may be locked to the flange 14 or released. Within the back 13 and at a convenient distance in front of it is a curved rail 29 which forms a support for the type-bars, as presently described, this rail being supported on suitable brackets 30. The rail is provided with a series of supporting-brackets 31, which are fastened to it so as to project inward from it and also upwardly and rearwardly, as shown in Fig. 4, and to the inner and lower end of each bracket is pivoted a link 32, which is also pivoted, as shown at 34, to a type-bar 33, this being curved slightly and having its upper end arranged to extend opposite the ink-pad, as shown clearly in the figure referred to. The type-bar 33 is forked at its lower end, as shown in Fig. 1, and pivoted in it is a curved lever 35, which, near its rear end, is pivoted, as shown at 36, to the bracket 31 and at its lower and rearwardly-extending end 37 is connected by a rod 38 with a key 39, which is arranged beneath the base of the machine, and the several rods 38 extend downward through holes 38$^a$ in the base.

Figures 12, 13, 14, 15, 16:
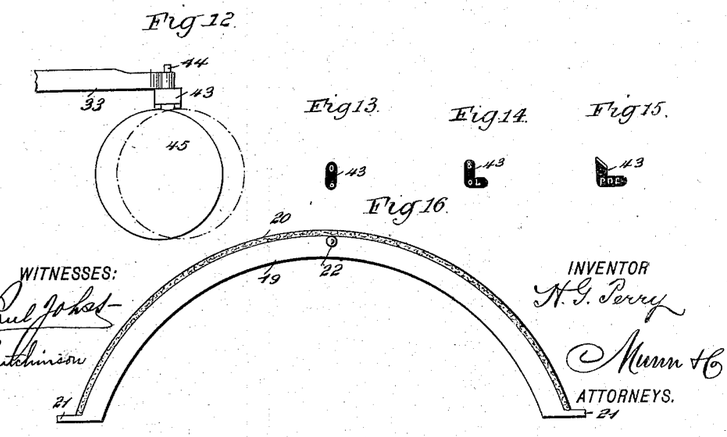
Fig. 12 is a detail view illustrating the two positions of the platen with relation to the type.
Figs. 13 to 15 show details of the several prongs of type-blocks and type.
Fig. 16 is a detail plan view of the ink-pad frame.

There is a key 39 for each type-bar, and each key is pivoted, as shown at 40, beneath the base 10, and at its forward end is connected by a rod 41 with a finger-piece 42, the finger-pieces of the several keys being arranged in banks in substantially the usual manner, and each key being marked with the character represented by the type of the bar with which the key connects. Each type-bar 33 has at its free end a type-block 43 carrying type representing the usual characters, although the blocks for printing single letters are elongated, as shown in Fig. 13, with the upper-case character at one end of the type-block and the lower-case at the other; but for printing two or three letters the blocks are made L-shaped, as shown in Figs. 14 and 15, so as to provide on one arm of the block room for the several characters. The blocks have pintles 44 by which they are fastened to the type-bars 33, and these pintles project through the type-bars, as shown clearly in Fig. 12, so that in case a type-bar is actuated before the preceding one has left the platen the type of the second type-bar will slip on over the pintle 44 and the type will not be injured.

The several type-bars are arranged in the segment of a circle, so that they will have a common printing-point on the platen 45, which is of the usual kind, being preferably, however, formed with a wooden core and a rubber sleeve or coating. The type-blocks are set in the type-bars at such an angle therewith that they will be at right angles with the platen when at the printing-point, the type-blocks near the center of the segment being almost parallel with their type-bars, and the nearer the ends of the segment are approached the greater the angularity of the type-blocks with their type-bars. The platen is mounted on a carriage which is movable backward and forward and also endwise, as hereinafter described, and the full and dotted lines in Fig. 12 show the two positions of the platen with reference to the type-blocks 43, and it will be seen that when in its normal position the platen will be in position to receive lower-case characters; but when pulled forward to the position shown in dotted lines it will be in position to receive the upper-case characters of the type-block; but owing to the curvature or convexity of the platen but one character of a type-block will strike it at a time.

In order that accurate alignment may be made a guide 46 is arranged between the type-bars and the platen, this guide having a vertical segmental flange 47, which is concentric with the type-bars and is notched to receive them, there being a notch for each type-bar, and the type-bars are beveled on their inner edges so that they may enter and be accurately guided by the slots in the guide.

The shaft of the platen 45 is mounted in supporting-blocks 49 on the carriage 50, (shown clearest in Fig. 11,) and the carriage is provided with slideways 51 on its under side and opposite edges, these rails or slideways extending the full length of the carriage and being longitudinally grooved to receive the bearing-balls of the carriage, as presently described. The grooved rails 51 of the carriage are placed opposite similarly-grooved rails 52 of the carriage-frame 53, which has parallel longitudinal cross-bars 54 connecting its opposite ends and which is hung as described below. The grooves of the rails 51 and 52 receive bearing-balls 55, which thus enable the carriage to be moved easily in an endwise direction from right to left, or from left to right, and the balls are guarded against displacement by the screws 56, (see Fig. 4,) which are arranged near the ends of the rails, and which fasten them to the carriage and to the carriage-frame respectively.

Figures 9, 10, 11:
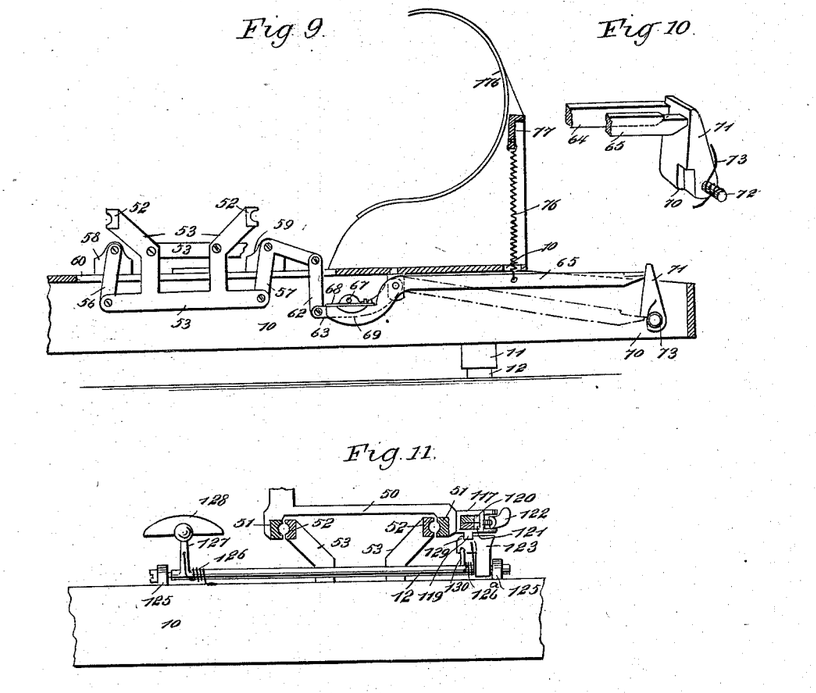
Fig. 9 is a sectional elevation showing in detail the carriage-supporting frame and the lever mechanism for actuating it.
Fig. 10 is an enlarged detail view of the mechanism for locking and releasing the shift-keys.
Fig. 11 is a detail cross-section showing the means for sounding the bell when the end of a line is neared.

The carriage-frame has its ends hung in slots 60 near opposite sides of the base 10, and its end portions are hung on links 56 and bell-cranks 57, as shown clearly in Fig. 9, these links and bell-cranks being pivoted on blocks 58 and 59, which are secured to the base 10. The bell-cranks 57 are connected by a cross-bar 61, so that both may move in unison, thus imparting an even movement to both ends of the carriage-frame, and one of the bell-cranks 57 is connected by a link 62 with an arm 63, (shown best in Fig. 2,) which arm is arranged between the shift-keys 64 and 65 and is fulcrumed on the same pivot as the levers, as shown at 66. The arm 63 is provided with a cross-pin 67, which extends across the rear ends of the shift-keys 64 and 65, and the cross-pin at one end rests on a spring 68, which extends above a recess 69 in the key 65, so that when this key is depressed to shift the carriage-frame it may continue to descend at its front end after the shift has been made, so that the free end of the key may engage the notch 70 of the catch 71, which is fulcrumed or pivoted on a pin 72 at one corner of the bank of keys, (see Fig. 2,) and the catch is pressed normally against the ends of the keys by a spring 73, which encircles the pin 72 and presses against the catch.

The keys 64 and 65 are provided with finger-pieces 74 and 75, and when the carriage is to be shifted forward, so as to bring the platen in position for upper-case printing, the key 64 is depressed, and this causes the rear end of the key to lift on the pin 67 and arm 63, thus raising the link 62 and tilting the bell-cranks 57 so as to swing the carriage forward, and the carriage-frame returns to normal position when the key is released; but if the carriage and frame are to be locked forward, so that many upper-case characters may be printed with ease, the key 65 is depressed and it acts on the pin 67 and connected parts exactly as already described, and after the shift has been made the buckling of the spring 68 permits the key to be further moved, so that it engages the notch 70 of the catch 71 and is thus held. When the carriage and frame are to be returned the shift-key 64 is depressed and then released, and the depression of the key tips back the catch 71 against the tension of the spring 73, and thus releases the key 65 from the notch 70.

The keys 64 and 65 are held normally raised by springs 76, which are secured to the keys and to a rail 77 above them, Fig. 9, and when the keys are released the carriage-frame is pulled back by a spring 78, which is secured to one of the cross-bars 54 and to the base 10 of the machine.

The carriage receives its longitudinal movement from a spring-barrel 79, the spring 80 of which is shown by dotted lines in Fig. 2, and is arranged in the usual manner, having one end attached to the spring-barrel and the other to its shaft, and the spring-barrel has on its upper end a cog-wheel 81, which engages the pins 82 in the regulating-wheel 83, this being journaled on the base 10 near the spring-barrel, as shown clearly in Fig. 2, and the regulating-wheel acts in the nature of an escapement to prevent the too rapid rotation of the cog-wheel 81 under the impetus of its spring. The spring-barrel carries a cable 85, although any suitable chain or tape may be used, and this cable runs over a guide-pulley 86 and is secured to the carriage 50, so that the tension of the spring 80 serves to pull on the cable 85 and move the carriage from right to left.

The movement of the carriage from right to left is controlled by an escapement which works in conjunction with a rack-bar 87, which extends longitudinally beneath the carriage and the notches of which correspond to the single lower-case letter-spaces, this rack-bar being normally pressed downward by a flat spring 88, as shown best in Fig. 2, and it is capable of an up-and-down movement, being at one end secured to a swinging arm 89 (see Fig. 2) and at the other to a bell-crank 90, (see Fig. 4,) the arm 89 and bell-crank being fulcrumed on the ends of the carriage, and the bell-crank terminates at one end in a finger-piece 91, which may be moved to tilt the bell-crank and lift the rack-bar when the latter is to be freed from the escapement, as described below, and the other end of the rack-bar may be raised by a lever mechanism to be hereinafter described.

The rack-bar is engaged by an escapement 92, which, in connection with the keys of the machine, controls the movement of the carriage from right to left, and this escapement comprises a hollow post 93, which has at the bottom a hub 94, this being pivoted between center screws 95 so as to swing backward and forward, and the center screws are held in suitable cross-pieces 96, which are attached to the bars 54 of the carriage-frame. The post 93 is provided at its upper end and on its front and rear sides with rigid pawls 1 and 4, which are adapted to engage the rack-bar, and it has within it spring-pressed pawls 2 and 3, these being pressed forward to the right by independent springs 97, so that they are normally held the distance of one notch in advance of the rigid pawls 1 and 4.

The escapement 92 is curved at the top, as shown in Fig. 8, so that the pawls will successively engage the rack-bar 87 when the post 93 is tipped. The pawl 2 is provided with a cross-arm 98, which presses against the pawl 3, and thus the pawl 3 may be pushed back against its spring independently of the pawl 2; but when the pawl 2 is pressed back it carries the pawl 3 with it. It will be seen that the escapement 92, as it swings backward and forward, will cause the pawls 1, 2, 3 and 4 to successively engage the rack-bar, and means will be hereinafter described for moving the post 93 the requisite distance to provide for the necessary movement of the rack-bar and carriage, which movement is regulated by the escapement, as follows: Supposing the pawl 1 to be in engagement with the rack 87, the latter and the carriage to which it is attached will be at rest; but when the escapement is brought forward the rack-bar engages the pawl 2, which springs back against its spring a distance of one space and permits the carriage to advance this distance to the left, this spacing taking place before the type strikes. When the escapement returns to its original position, said pawl 2, which will then be released from the notched bar, will resume its original position, and in this way the single spaces are produced.

When a double-space type-key is struck, the escapement is rocked forward until the pawl 3 engages the rack-bar 87, the carriage going one space to the left when the pawl 2 engages the rack-bar; but when the pawl 2 is pressed back the pawl 3 is carried with it, as above explained, so that the pawl 3 engages the rack-bar. The carriage does not move any farther to the left; but pawl 2, being released, resumes its original position. Now when the escapement is rocked back and pawl 2 again engages the rack-bar the carriage once more moves one space to the left, making two spaces in all, one before the type struck and one after.

When a triple-space type is struck, the escapement is rocked forward until pawl 4 engages the rack-bar, the carriage going one space to the left before the type strikes the platen, as in the former case; but when pawl 4 is engaged pawls 2 and 3 both resume their original position. Then when the escapement is rocked back and pawl 3 engages the rack-bar the carriage moves one space to the left, and when pawl 2 engages the rack-bar the carriage moves another space to the left, making three spaces in all, one before the type struck and two after.

The escapement is operated by a rod 99, which is connected to the post 93 by a screw 100, and the rod 99 extends forward and is connected to the rocker 101, which comprises two bell-crank levers 102, arranged at opposite sides of the machine, and cross-bars 103 and 104 connecting the upper and lower ends of the bell-crank. The cross-bar 104 is preferably flat, as shown in Fig. 6, in order that it may the better engage the arms 108, as presently described. The rocker-levers or ends 102 are pivoted to arms 105, which project forward from the cross-bars 54 of the carriage-frame 53, and thus the rocker is carried backward and forward with the carriage-frame, so as to always be in the right position with relation to the carriage and frame. The rocker is normally tilted to the position shown in Fig. 4 by a spring 106, which is secured to a stop-plate 107 on the carriage-frame, this stop serving to limit the movement of the carriage, as hereinafter described, and when the rocker is pulled back, as above specified, it, by reason of the rod 99, pushes back the escapement 92 to its normal position. Pivoted between the ends 102 of the rocker are the key-arms 108, there being an arm for each key 39, and these arms are normally held upward by springs 109, which are secured to the arms and to the rail 77, (see Fig. 6,) and the arms are pulled down by wires or rods 110, which connect the arms with the type-keys 39. These arms 108 are adapted, when depressed, to engage the bar 104 of the rocker 101, and so tilt the rocker and move the escapement 102, and it will be understood that where the single space-keys—that is, the keys operating type representing a single character—are used it is only necessary to pull the escapement forward so that the pawl 2 will engage the rack-bar 87 and permit the rack-bar and carriage to move one space, whereas when a double-character key is struck the rocker must be further tilted to pull the escapement so as to bring the pawl 3 into engagement with the rack-bar, and when a triple-character key is struck the escapement must be tilted so as to bring the pawl 4 into engagement with the rack-bar, as above described. To this end the several classes of keys (those operating single, double and triple type) must be pressed down the proper distance at the points where the wires 110 connect with them; but since the opposite ends of all the keys, where the rods 38 connect, move the same distance therefore the keys 39 of the several classes must be properly proportioned off and pivoted so that they may have the proper movement at each end. Those operating single type must be pivoted at a point about half-way between the connecting-points of the rods 38 and 110. Those keys operating double type must be pivoted nearer to the connecting-point of the rod 38, and those operating triple type must be pivoted still nearer to the connecting-point of the rod 38.

As illustrated in Figs. 14 and 15, all of the upper-case characters upon the double and triple type-blocks are single characters. This being the case it is necessary to have means for causing the carriage to move only one space, instead of two or three, when one of them is printed. To this end the arms 108, which connect with the double-type operating-keys, are notched, as shown by dotted line 112 in Fig. 4, so that when the carriage is shifted forward for printing the upper-case characters (carrying with it the rocker 101, which, as before stated, is pivoted to the ends of the arms 105, which are fastened to the carriage-frame, as above described, and the arms 108 remaining stationary) the rod 104 of the rocker is brought under the notch, and when the arm is depressed, as shown in Fig. 6, the rocker is only rocked enough to bring the pawl 2 into engagement with the rack-bar, and for the same reason the arms 108, which connect with the triple-type operating-keys, are likewise notched, as shown by dotted line 113 in Fig. 4; but they are notched deeper than are the double-spacing arms, and the single-spacing arms 108 are also slightly notched, as shown by line 111 in Fig. 4, but only enough to overcome the difference which would arise by shifting the rod 104 nearer to the ends of the arms 108.

For holding the front ends of the keys 39 in their proper positions, and for guiding them when they are depressed, notches 114 are made in the cross-piece or comb 115 of the base 10, and the keys are held to move in these notches.

To limit the longitudinal movement of the carriage and to adjust it so that it may have any desired sliding movement, stops 116 and 117 are used, these being arranged on the bar 118, which extends along the front edge of the carriage, and these stops are adjustable, as presently described, and have on their under sides lugs 119, which are adapted to contact with the stop-plate 107, above referred to, and so stop the carriage. The bar 118 is marked off in inches and tenths of inches, and it is provided with double rows of notches 120 and 121, these being of opposite pitch and adapted to engage the pawls 122, which are pivoted on the stops 116 and 117, and which, by engaging the notches of the bar, hold the stops in a desired position. By having the pawls engage the opposite rows of notches the stops are thus made to limit the carriage in its movement either way, the stop 116 limiting its movement to the right and the stop 117 limiting its movement to the left. It will be seen that the stops 116 and 117 may be very easily adjusted, so as to make the movement of the carriage and the length of the lines to suit. The lug 119 on the bottom of the stop 117, besides engaging the stop-plate 107, is also adapted, before it reaches the end of a line, to strike the arm 123 of the bell-shaft 124, which is arranged at right angles to the carriage and is journaled in supports 125 beneath the carriage. The shaft is pressed by a spring 126, (see Fig. 11,) so as to normally throw the hammer 127 against the bell or gong 128, which is mounted behind the carriage on the base 10, and the arm 123 is loose on the shaft and is normally pressed by a spring 126ᵃ to hold the lateral extension 129 of the arm in contact with the pin 130 of the shaft 124. The arm 123 is wide enough to engage the lug 119 when the carriage is in either its backward or forward position, and when the carriage is thrown back from left to right the arm 123 is moved against the tension of the spring 126ᵃ without actuating the shaft 124 or sounding the bell; but when the machine is printing and the end of a line is approached the lug 119 strikes the arm 123 and pushes it against the pin 130, thus rocking the shaft 124, and as soon as the lug passes the arm the spring 126 throws the hammer 127 against the gong and sounds the alarm.

Figure 3:
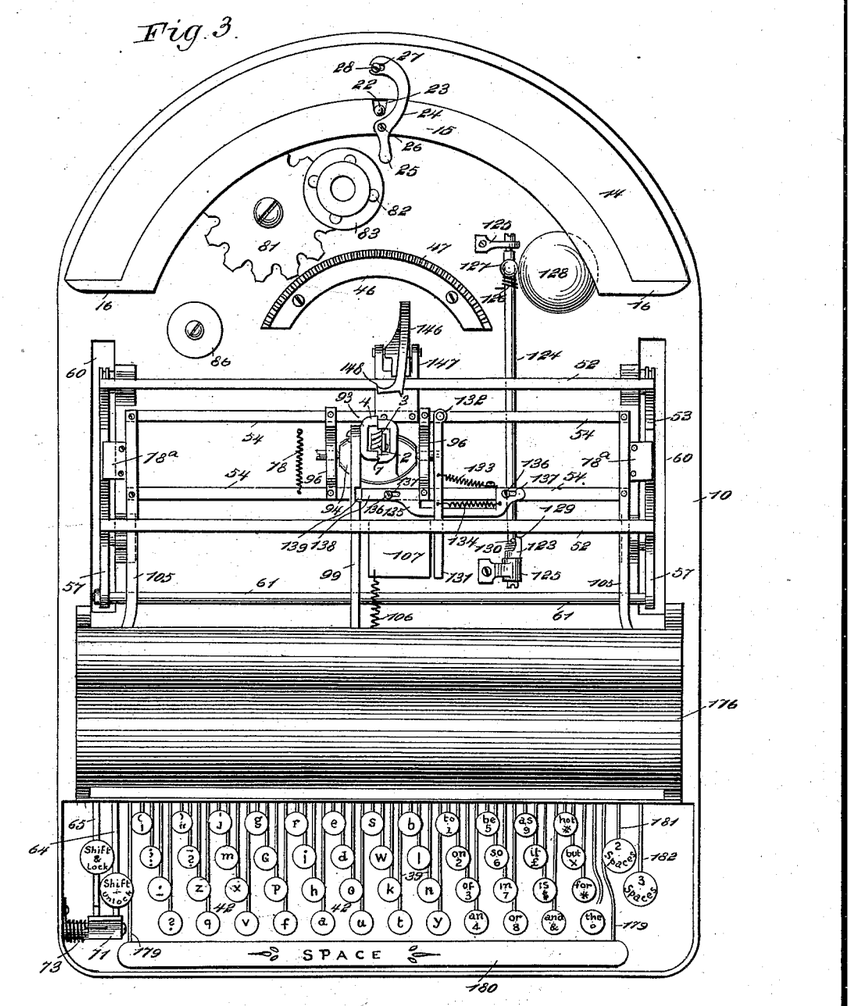
Fig. 3 is a plan view with the carriage removed.

When the lug 119 of the stop 117 reaches the transverse lever 131, which it does at one space before the end of the line is reached, but one more type can be struck before the lug presses the lever to the left against the stop-plate 107, thus determining the movement of the carriage to the left. This last spacing takes place after the rod 99 has been drawn forward, and upon returning to its normal position it is locked, as hereinafter described, and prevented from being drawn forward. Hence the keys 39 cannot be depressed, as the rocker 101 is immovable. The transverse lever 131 is pivoted on one of the bars 54 of the carriage-frame, as shown at 132 in Fig. 3, and is held back in its normal position by the spring 133 and connected by the spring 134 with the slide 135, which is held to one of the bars 54 of the carriage-frame by screws 136, which project through slots 137 in the slide. This slide has an elongated end 138, which is adapted to enter a notch 139 in the rod 99 while in its normal position. A small pin in the slide 135 to the right of the lever 131 prevents the slide from springing to the left unless the lever is pushed to the left. By this arrangement it will be seen that the lever 131 may be pushed to the left while the slide 135 is held stationary, and that as soon as the slide is allowed it will immediately spring to the left also. Hence the rod 99 having been drawn forward out of its normal position before the last space is made by the carriage and before the lever 131 is pushed to the left the end 138 of the slide 135 cannot enter the notch 139 until the rod 99 has returned to its normal position; but immediately upon it returning to its normal position the end 138 of the slide 135 enters the notch 139 and prevents the rod 99 being drawn forward again, and thus none of the keys 39 can be operated, for the rocker 101 is immovable, and hence there is no danger of printing one letter on another at the end of a line, as is frequently done with most type-writing machines.

A gage-bar 140 is held normally just in front of the center of the platen 45, as shown in Figs. 2 and 6, and this bar is marked off into inches and tenths of inches, so as to correspond with the notches in the rack-bar 87 and the stop-bar 118, and this gage-bar has at one end a handle 140ᵃ, by which it and the arms 141 which carry it may be tipped back when desired, especially when a sheet of paper is being inserted in the machine. The arms 141 are curved downwardly and rearwardly beneath the platen, as shown best in Fig. 4, and are pivoted, as shown at 142, to the rear rail 51 of the carriage. The gage-bar 140 is held in its normal position by spring-pressure applied to one of the arms 141. When necessary the gage-bar may be pushed back and held by engaging the shoulder 143 of the catch 144, which is pivoted to one end of the carriage, as shown clearly in Fig. 4, and is pressed upward by the spring 145.

Secured to the back of the carriage-frame is a curved pointer 146, which extends upward and forward over the platen and has at its free end a finger 148, adapted to indicate the exact point where the next type will strike on the platen—that is, the printing-point—and this pointer 146 also extends above the gage-bar 140, so as to indicate accurately the number of the notch or space, and thus, by means of the pointer, the gage-bar, and the numbered notches or spaces, the carriage may be quickly and accurately adjusted. The pointer 146 is pivoted in a bracket 147 on the back of the carriage-frame and is normally pressed upward by a spring 149. (See Fig. 6.)

The following mechanism is used for line-spacing: The platen-shaft has at one end a thumb-wheel 150, by means of which the platen may be turned backward and forward when desired, and at the other end of the platen its shaft is provided with a ratchet-wheel 151, which has opposite it and on the shaft of the platen a sleeve 152, on which is an arm 153, the downward movement of which is limited by a stop 154 on the rail 51 of the carriage, (see Fig. 5,) and the arm is normally pressed down against the stop by a spring 155, (see Fig. 2,) which is coiled around the sleeve and is connected to the arm and to the carriage. On the outer end of the arm 153 and on one side thereof is a pawl 156, which has a suitable handle 157 and engages the ratchet-wheel 151, while the lower end of the pawl projects below the arm 153 to engage the detents of the ratchet-wheel, as presently described. The pawl is held in engagement with the ratchet-wheel by a spring 150ᵃ. The ratchet-wheel and consequently the platen 45 are prevented from turning back by the detent 159, which is pivoted on the rail 51 of the carriage, and the detent is held against the ratchet-wheel by a spring 160. A prolongation 161 of the detent extends beneath the lower end of the pawl 156, and a notch 162 in the aforesaid prolongation is adapted to engage and hold the lower end of the pawl, so that if desired the pawl may be pulled back, and as it moves it presses down the detent 159, and, entering the notch 162, both pawl and detent are held released from the ratchet-wheel, and the platen may then be freely turned by hand in either direction. In the upper side of the arm 153 is a recess 153ᵃ, which receives a pin 164, (see Fig. 2,) and a spring 165 on the arm presses downward on the pin and holds in place the pin and the eccentric 163, to which the pin is attached, this eccentric being pivoted on the arm 153 and serving as a line-regulator. The eccentric extends into the path of the vertically-swinging arm 166, which is carried by the shaft 167, which is journaled on one end of the carriage 50, and is operated by a lever 168, which is secured to the shaft and extends upward, so as to be easily struck by the hand of the operator. It will be seen that when the lever 168 is moved to the right the arm 166 is raised against the eccentric 163 and the latter lifts the arm 153 and pawl 156, so as to turn the ratchet-wheel 151 and move the platen 45 to advance the paper a line, and it will be noticed that the eccentric may be turned so that the tilting of the arm 166 shall lift the pawl to a greater or less extent, as desired, and thus make the requisite spacing between the lines.

The lever 168 has a notch 169 at its lower end, (see Fig. 1,) which engages a stop-arm 170, which is secured to the carriage and which thus limits the movement of the lever. The arm 166 of the shaft 167 extends beneath the arm 171 of the rack-bar 87, so that when the arm 166 is tilted the rack-bar is raised and released from its escapement. It will be observed then that when the carriage has traveled from right to left in printing a line and it is to be returned to print a new line the operator has merely to strike the lever 168 and swing it to the right, and this raises and releases the notched bar 87, also raises the pawl 156 and turns the platen in the manner described above, and at the same time it carries the carriage back to the right in position for printing another line.

The carriage is provided with a top plate 172, which covers the mechanism beneath and serves also as a guide for the paper, this plate being curved upward behind the platen, as shown clearly in Figs. 2, 4 and 6, and at its rear end the plate is open, as shown at 173, to provide for the small roller 174, which serves as a paper-guide and turns against the platen 45, the roller 174 being journaled in springs 175, which are secured to the carriage. The paper, after passing around the platen and over the plate 172, passes upon another curved plate or shield 176, which prevents the paper from extending over the finger-pieces 42 of the machine-keys, and this shield is secured to brackets 177 on the base 10 of the machine, and the front ends of the brackets have attached thereto a face-plate 178.

The machine is provided with spacing-keys 179 to make the ordinary single spaces, these being connected with the rocker 101 precisely as the other keys are connected with it, and the space-keys 179 near opposite sides of the machine are connected by a finger-piece 180, which extends the full width of the keyboard, so that it may be conveniently struck. The machine is also provided with double-space keys 181 and triple-space keys 182, (see Fig. 2,) which have the usual finger-pieces and which are connected with the rocker in the manner already described and illustrated in Figs. 4 and 6, so as to move the escapement the requisite distance to permit the carriage to advance two or three spaces, as the case may be.

The paper 183 which is to be printed is inserted between the platen 45 and the roller 174 and beneath the gage-bar 140, and as the printing proceeds and the platen is turned the paper is fed forward over the plate 172. The printing is effected, as already described, by depressing the keys 39, and when a key is depressed it lifts on the rod 38, and this, acting on the lever 35, causes the type-bar 33 to first move slightly backward and downward, as shown by the dotted lines in Fig. 6, and then to swing forward so as to bring the type-bar 43 upon the paper and against the platen 45. When the key is released its spring returns it and the type-bar to normal position with the type-block resting against the pad. When the key is struck in printing it depresses one of the key-arms 108, tilts the rocker 101, and moves the escapement 92 so as to permit the movement of the carriage, as already specified. When the end of the line is reached and the carriage is to be returned, the operator strikes the lever 168 with sufficient force to move the carriage, release the escapement and turn the platen, all as previously described in detail.

Having thus described my invention, I claim as new and desire to secure by Letters Patent—

1. In a typewriting machine, the combination with a frame having an upright back and the swinging type bars having type at their free ends, of a swinging trough-like ink-pad frame hinged to the back, adapted to swing away from the type to permit the same to be cleaned and the ink-pad to be changed, but held stationary while in use, a removable ink-pad carried by said ink-pad frame and having toes to engage pins in the back when the ink-pad frame is closed, and a latch to lock the ink-pad to the back of the machine frame, substantially as set forth.

2. In a typewriting machine, the combination with the platen and the swinging ink-pad frame arranged above the platen, carrying a removable ink pad and held stationary while in use, of the type bars arranged in a curved row behind the platen and carrying type at their free ends to engage the rear face of the stationary ink pad and mechanism for moving the type backward from the ink pad and downward and forward under the ink pad to the platen, substantially as described.

3. In a typewriting machine, the combination with the platen and the ink-pad arranged above the platen and having a convex face, of the swinging type bars having type at their free ends adapted to engage the convex face of said ink-pad, the links pivoted to a support and to the type bars, the type bar levers pivoted to an adjacent support and to the type bars above the links, and a key mechanism for swinging the levers, substantially as described.

4. The combination with the platen, of the supporting rail behind the platen, the pendent links on the rail, the typebars pivoted to the links and provided at their free ends with type to strike the platen, the typebar levers pivotally supported on the rail and connected with the typebars above the links, and key mechanism for moving the levers, substantially as described.

5. The combination, with the platen, of the rail behind it, the brackets on the rail, the pendent links on the brackets, the type bars pivoted to the links and carrying type to strike the platen, the curved type bar levers pivoted to the brackets and to the type bars, the operating keys, and rods connecting the keys and type bar levers, substantially as described.

6. In a typewriting machine, the combination with a sliding carriage and swinging type bars carrying type at their free ends, each type having an upper case printing point and a lower case printing point, the upper case characters being all single space characters and the lower case characters being single space characters on some of the type, double space on other type for printing two letters and triple space on other type for printing three letters, of the mechanism for spacing the carriage the proper number of spaces to correspond to the kind of type printed, consisting of a rack-bar, an escapement having two rigid pawls and two yielding pawls, a rocker for operating the escapement, a series of notched arms for operating the rocker and the key levers for operating the arms and type, substantially as set forth.

7. The combination, with the carriage movable backward and forward, the bell crank connected with it, the link connected with the bell crank, the arm pivoted to the bell crank and provided with a transverse pin, the tilting shift keys straddling the arm, one of them having a recess in its upper side, and a spring extending beneath the pin and above the recess of the key, substantially as described.

8. The combination, with the sliding carriage and the rack bar beneath it, of the hollow escapement post swinging at right angles to the rack bar and provided with rigid pawls to engage the rack bar, the independent spring-pressed pawls within the post adapted also to engage the rack bar, an arm secured to one spring-pressed pawl and overlapping the other, and a key mechanism to move either pawl into engagement with the rack bar, substantially as described.

9. In a typewriting machine, the combination, with the carriage frame movable backward and forward and the sliding carriage mounted thereon, of the rack bar beneath the carriage, the escapement pivoted to the carriage frame and provided with rigid and yielding pawls to engage the rack bar, the spring-pressed rocker pivoted to the carriage frame and operatively connected with the escapement, the key arms pivoted to the machine frame near the rocker and provided with notches to engage the rocker when shifted forward, and a key mechanism for moving the key arms, substantially as described.

10. The combination, with the sliding carriage, the escapement controlling the movement of the carriage, the key-operated rocker and the notched rod connecting the escapement and rocker, of the slide to engage the notched rod, and means for moving the slide by the movement of the carriage, substantially as described.

11. The combination, with the carriage, the rack bar beneath it, the escapement engaging the carriage, the key-operated rocker and the notched bar connecting the rocker and escapement, of the slide mounted beneath the carriage to engage the notched bar, a spring-pressed lever in the path of a lug on the carriage, and a spring connection between the lever and the slide, substantially as described.

12. In a typewriting machine, the combination with the sliding carriage and the notched rack-bar beneath the same, of the bar extending along the front of the carriage and provided with two rows of notches of opposite pitch, equal in number and corresponding to the notches of the rack-bar and graduated and marked from left to right, the two slides on the bar, each having a pawl adapted to engage a separate row of notches, the left slide determining the beginning of the lines of writing and the right slide determining the ending of the lines of writing, the abutment in the path of the left slide, the striking arm of the alarm-sounding device in the path of the right slide adapted to sound the alarm at any point along the scale, and the locking lever also in the path of the right slide adapted to lock the keys at ten spaces after the alarm is sounded, at whatever point along the scale that may be, substantially as set forth.

13. In a typewriting machine, the combination, with the sliding carriage carrying a cylindrical platen, of the rack bar beneath the carriage, a double notched and graduated bar extending longitudinally on the carriage, the typebars adapted to strike forward on top of the platen, the guide in the path of the typebars behind the platen, a gage bar held parallel with and above the platen and marked to correspond with the number of notches in the rack bar and the graduations on the double notched bar, the pivoted arms supporting the gage bar and extending under the platen adapted to swing backward over the platen, and a catch to engage the gage bar and hold it away from the platen, substantially as described.

14. In a typewriting machine, the combination, with the sliding carriage and the cylindrical platen thereon having a ratchet wheel at its right end, of the vertically movable rack bar extending longitudinally beneath the carriage engaging an escapement and mounted on pivoted arms, one of which extends forward and upward forming a finger piece for raising the rack bar, a laterally-tilting upwardly-projecting hand lever pivoted to the right side of the carriage, and an operative connection between the lever and the rack bar and between the lever and the ratchet wheel on the platen to simultaneously lift the rack bar and turn the platen when the lever is tilted to the right, substantially as described.

15. In a typewriting machine, the combination, with the sliding carriage and the cylindrical platen thereon having a ratchet wheel at its right end, of the vertically movable rack bar extending longitudinally beneath the carriage and engaging an escapement, the laterally-tilting upwardly-projecting hand lever fixed to a shaft pivoted to the right side of the carriage, the arm attached to the shaft, the spring-pressed arm journaled on the shaft of the platen and extending forward beside the ratchet wheel, a stop engaging the arm, a pawl pivoted to the end of the arm to engage the ratchet wheel on top and having a downward extension, a lug pivoted to the opposite side of the arm in the path of the arm on the lever shaft and having its lower edge divided into three portions at varying distances from the center and having projections on the side next the arm to be engaged by a spring attached to the arm so that either of the parts of its lower edge may be engaged by the arm on the lever shaft, an arm attached to the rack bar and extending backward above the arm on the lever shaft, to be engaged by it, and a stop attached to the carriage and engaging the hand lever limiting its motions, substantially as described.

HORACE G. PERRY.

Witnesses:
O. R. COGHLAN,
R. E. WILLOT.